US010871624B2

United States Patent
Nagao

(10) Patent No.: US 10,871,624 B2
(45) Date of Patent: Dec. 22, 2020

(54) OPTICAL APPARATUS

(71) Applicant: CANON KABUSHIKI KAISHA, Tokyo (JP)

(72) Inventor: Yuki Nagao, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/795,478

(22) Filed: Oct. 27, 2017

(65) Prior Publication Data
US 2018/0129012 A1  May 10, 2018

(30) Foreign Application Priority Data

Nov. 4, 2016  (JP) .................................. 2016-216181

(51) Int. Cl.
| G02B 9/00 | (2006.01) |
| G02B 7/02 | (2006.01) |
| G02B 1/11 | (2015.01) |
| G02B 3/00 | (2006.01) |
| G02B 1/113 | (2015.01) |

(52) U.S. Cl.
CPC ................ *G02B 7/025* (2013.01); *G02B 1/11* (2013.01); *G02B 3/00* (2013.01); *G02B 7/021* (2013.01); *G02B 1/113* (2013.01); *G02B 2003/0093* (2013.01)

(58) Field of Classification Search
CPC .......... G02B 7/025; G02B 7/022; G02B 7/02; G02B 7/026; G02B 7/021
USPC ......................................... 359/811–830, 796
See application file for complete search history.

(56) References Cited

U.S. PATENT DOCUMENTS

| 2008/0062518 | A1 | 3/2008 | Inoue | |
| 2009/0185291 | A1* | 7/2009 | Tsuchiya | G02B 7/021 359/738 |
| 2011/0063739 | A1* | 3/2011 | Hirata | G02B 7/021 359/819 |
| 2011/0205643 | A1* | 8/2011 | Schreiber | C23C 14/0694 359/819 |
| 2014/0218813 | A1* | 8/2014 | Araki | G02B 7/021 359/819 |

FOREIGN PATENT DOCUMENTS

| JP | H06109903 A | 4/1994 |
| JP | 2001350074 A | 12/2001 |

(Continued)

OTHER PUBLICATIONS

Office Action issued in Japanese Application No. 2016-216181 dated Feb. 18, 2020. English translation provided.

*Primary Examiner* — Mahidere S Sahle
(74) *Attorney, Agent, or Firm* — Rossi, Kimms & McDowell LLP

(57) ABSTRACT

An optical apparatus includes an optical element, and an attached member to which the optical element is attached. The optical element and the attached member are adhered to each other by an adhesive while the optical element and the attached member contact each other. The optical element includes a flange part that projects from an outer peripheral surface to an outer periphery direction. The adhesive is adhered so as to cover the flange part in an adhesion area where the optical element and the attached member are applied to each other by the adhesive.

12 Claims, 4 Drawing Sheets

(56) References Cited

FOREIGN PATENT DOCUMENTS

| | | | |
|---|---|---|---|
| JP | 2006072020 | A | 3/2006 |
| JP | 3819134 | B2 | 9/2006 |
| JP | 2008275728 | A | 11/2008 |
| JP | 2008305516 | A | 12/2008 |
| JP | 2009282264 | A | 12/2009 |
| JP | 2011043702 | A | 3/2011 |
| WO | 2012164938 | A1 | 12/2012 |
| WO | WO-2012164938 A1 * | 12/2012 | ............... G11B 7/22 |

* cited by examiner

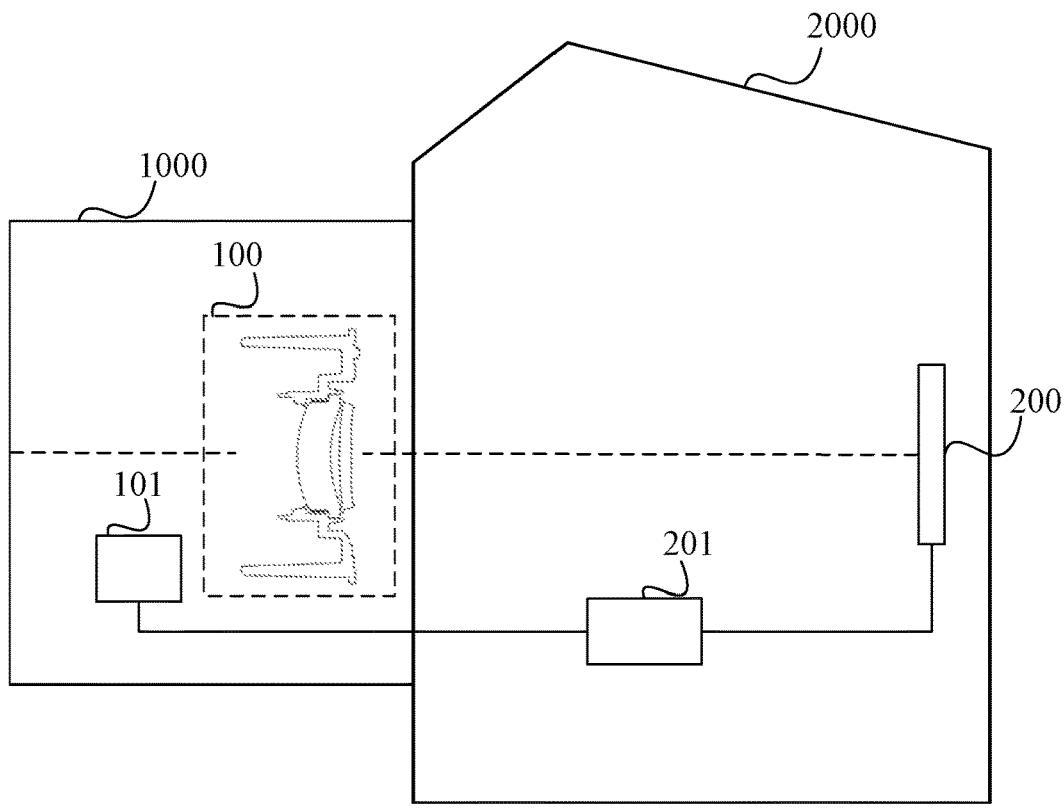
FIG. 1
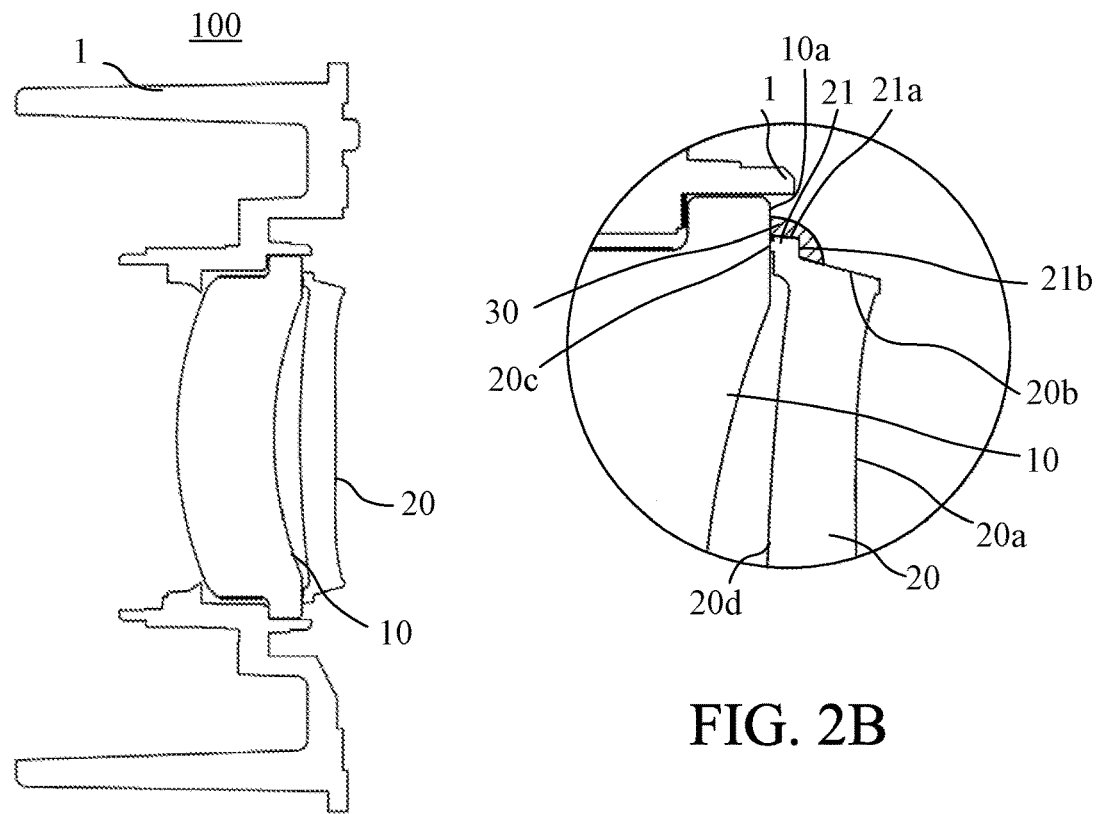
FIG. 2A
FIG. 2B

OPTICAL APPARATUS

BACKGROUND OF THE INVENTION

Field of the Invention

The present invention relates to an optical apparatus.

Description of the Related Art

An optical apparatus, such as a digital camera, a video camera, and an interchangeable lens, has recently employed a resin lens (plastic lens) instead of one or more of glass lenses. It is necessary to firmly fix an optical element onto an attached member with a good positional accuracy without generating a distortion in an optical function plane. When the resin lens is fixed onto a barrel by heat caulking, the heat caulking provides a stress to the resin lens and degrades the optical performance. Accordingly, there has been proposed a method for adhering and fixing the resin lens to the lens barrel or the adjacent optical element. Japanese Patent No. 3,819,134 proposes an optical element in which the adhesive is applied to an outer peripheral surface outside the optical effective diameter of an optical element and into a gap between a neighboring outer side surface of the optical element and an inner side surface of a holding frame so as to hold the optical element and a ring member is provided between the outer peripheral surface outside the optical effective diameter of the optical element and the adhesive.

The optical apparatus disclosed in Japanese Patent No. 3,819,134 can reduce the distortion of the optical function plane through the ring member, but increases the cost and degrades the assembly performance.

SUMMARY OF THE INVENTION

The present invention provides an optical element that can reduce a distortion of an optical function plane of an optical element and fix the optical element to an attached member.

An optical apparatus according to one aspect of the present invention includes an optical element, and an attached member to which the optical element is attached. The optical element and the attached member are adhered to each other by an adhesive while the optical element and the attached member contact each other. The optical element includes a flange part that projects from an outer peripheral surface to an outer periphery direction. The adhesive is adhered so as to cover the flange part in an adhesion area where the optical element and the attached member are applied to each other by the adhesive.

Further features of the present invention will become apparent from the following description of exemplary embodiments with reference to the attached drawings.

BRIEF DESCRIPTION OF THE DRAWINGS

FIG. 1 is a block diagram of a camera system as an optical element according to embodiments of the present invention.

FIGS. 2A and 2B are explanatory views of a lens unit according to a first embodiment.

DESCRIPTION OF THE EMBODIMENTS

Figure 3:
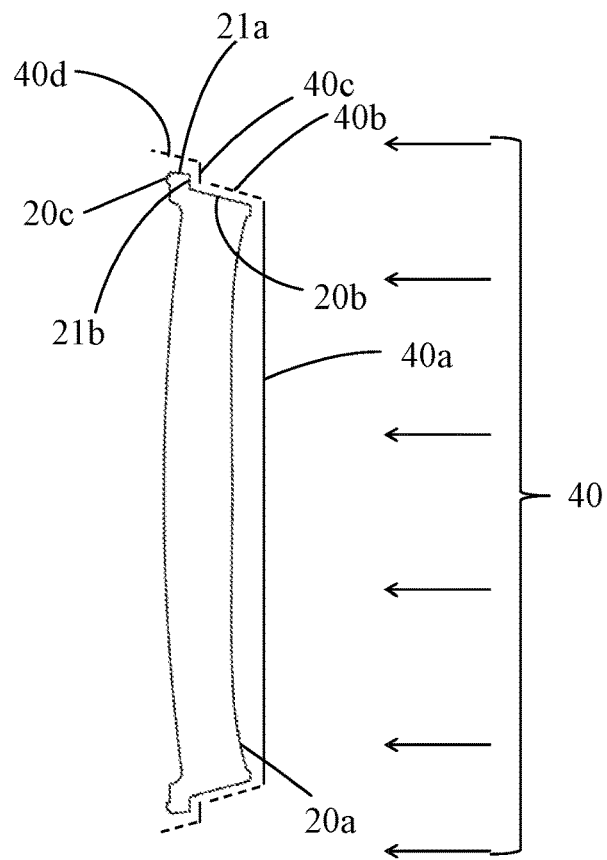
FIG. 3 is a schematic diagram when an antireflection film is evaporated onto a lens according to the first embodiment.

Referring now to the accompanying drawings, a description will be given of embodiments according to the present invention. In each figure, corresponding elements will be designated by the same reference numerals, and a description thereof will be omitted.

First Embodiment

FIG. 1 is a block diagram of a camera system as one illustrative optical element according to the embodiments of the present invention. The camera system includes a lens barrel 1000 as an interchangeable lens, a camera body 2000 to which the interchangeable lens 1000 is detachably attached. An optical apparatus according to the present invention is not limited to the camera system, and includes a lens interchangeable camera, a lens integrated camera, a lens barrel, a projector, etc. The camera includes an image pickup apparatus, such as a digital still camera and a video camera.

The lens barrel 1000 houses an image pickup optical system configured to form an optical image of an object. A lens unit 100 constitutes part of the image pickup optical system. An image pickup light flux from the object passes the image pickup optical system and forms an image on a light receiving plane (image pickup plane) of an image pickup element 200. The image pickup element 200 photo-electrically converts an optical image of an object formed by the image pickup optical system. A lens CPU 101 communicates with a camera CPU 201, transmits and receives information, and controls each component in the lens barrel 1000. The camera CPU 201 communicates with the lens CPU 101, and controls each component in the camera body 2000.

FIGS. 2A and 2B are explanatory views of the lens unit 100. FIG. 2A is a sectional view of the lens unit 100, and FIG. 2B is a partially enlarged view of FIG. 2A. In the following description, an optical direction is a direction in which the optical axis in the image pickup optical system extends. The right side is an image pickup plane side, and the left side is an object side.

A lens (attached member) 10 is inserted into an inner diameter part in a lens holding barrel 1, and is fixed into the lens holding barrel 1 by heat caulking so as not to floating or removing. A lens 20 is adhered to (and fixed onto) the lens 10 on the image pickup plane side of the lens 10 while the lenses 10 and 20 have a common optical axis (or the optical axis of the lens 10 is aligned with that of the lens 20). The position of the lens 20 is adjustable so that the optical axis of the lens 20 shifts from that of the lens 10 so as to optimize the optical image formed by the lens unit 100 or the image pickup optical system that contains the lens unit 100. In this case, the lens 20 is adhered to the lens 10 while the optical axis of the lens 10 shifts from that of the lens 20.

The lens 10 is made of an optical glass, and the lens 20 is a resin lens made of an optical resin material, such as cycloolefin polymer. Cycloolefin polymer is a hard-to-bond material having an extremely low adhesive property (representing hard-to-bond property). The lens 20 may be a lens made of a glass material representing a hard-to-bond property. The lens 20 has an optical function surface 20a on the image pickup plane side and an optical function surface 20d on the object side, as illustrated in FIG. 2B. The optical function surface means a continuous surface through which an image pickup light flux passes. The image pickup light emitted from the lens 10 passes the optical function surfaces 20d and 20a and then is guided the image pickup element 200. An outer peripheral surface 20b of the lens 20 is formed so that its diameter reduces in a direction separating from the lens 10 (towards the image pickup plane side). The lens 20 includes a flange part 21 that projects from the outer periphery part 20b to the outer periphery direction. The flange part 21 includes an outer periphery part. 21a and a connection part (plane part) 21b that connects the outer periphery part 21a with the outer peripheral surface 20b. The lens 20 further includes a contact part 20c that contacts a contact surface (contact part) 10a on the lens 10.

The lenses 10 and 20 are adhered to (and fixed onto) each other by an adhesive 30 while the contact surface 10a contacts the contact part 20c. For example, an ultraviolet curable adhesive that is curable by the ultraviolet light is used for the adhesive 30. The adhesive 30 adheres at least part of the contact surface 10a and at least part of the flange part 21 and the outer peripheral surface 20b. An area in which the lenses 10 and 20 are adhered to each other by the adhesive 30 will be referred to as an adhesion area in this embodiment. In other words, the adhesive 30 is applied to the adhesion area such that the flange part 21 is held between the adhesive 30 and the contact surface 10a (so as to cover the flange part 21). Hence, the adhering state between the contact surface 10a and the contact part 20c can be maintained. The rigidity of the adhesive 30 prevents the contact surface 10a from separating or shifting from the contact part 20c even when an impact is applied to the lens unit 100 from the outside. Therefore, the configuration of this embodiment can strongly fix the lens 20 onto the lens 10.

In this embodiment, the flange part 21 is connected to the optical function surface 20a via the outer peripheral surface 20b. Moreover, the flange part 21 (as thick as 0.5 mm or less in this embodiment) much thinner than (half as thick as) the part for forming the optical function surface of the lens 20. This means that the optical function surface is distant from the adhesion area and the rigidity near the adhesion area is much lower than that of part that forms the optical function surface. This configuration can reduce the distortion of the shape of the optical function surface of the lenses 10 and 20 caused by the contraction in hardening of the adhesive 30 and the contraction in the temperature change. In other words, the configuration of this embodiment can reduce the influence that causes the deterioration of the optical performance.

The flange part 21 may not be formed over the overall outer periphery of the lens 20, and may be formed only at least on the adhesive portion.

This embodiment forms an antireflection film (coating layer) that contains a material, such as $SiO_2$, on the surfaces of the optical function surfaces 20a and 20d. FIG. 3 is a schematic view when the antireflection film 40 is evaporated on the image pickup plane side of the lens 20. The lens 20 may be set to an evaporation coater so that the evaporation coater can release a film material to the lens 20 along the optical axis of the lens 20. This setting can make approximately uniform the film thickness of the antireflection film 40a evaporated onto the optical function surface 20a. Since the outer peripheral surface 20b is a bevel surface that has a slope relative to the optical axis, an antireflection film 40b thinner than the antireflection film 40a is evaporated onto the outer peripheral surface 20b. Since the connecting part 21b has a plane approximately vertical to the optical axis, an antireflection film 40c as thick as the antireflection film 40a is evaporated onto the connecting part 21b. The outer peripheral surface 21a has a bevel surface that has a slope relative to the optical axis, but the angle between the outer peripheral surface 21a and the optical axis is smaller than the angle between the outer peripheral surface 20b and the optical axis (or is approximately parallel to the optical axis) and thus an antireflection film 40d is less likely evaporated on the outer periphery part 21a. The antireflection films 40a, 40b, 40c, 40d have different film thicknesses, but each of them serves as the antireflection film 40.

Figure 4:
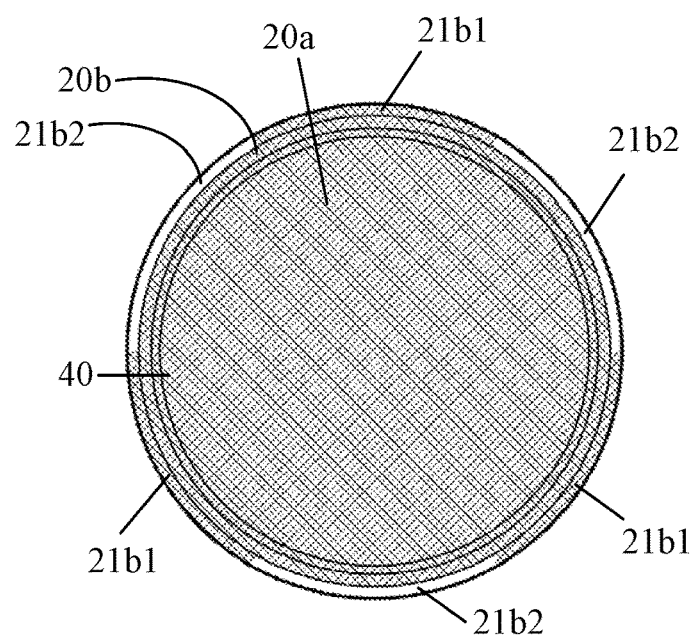
FIG. 4 illustrates a lens viewed from an image pickup plane side according to the first embodiment.

FIG. 4 illustrates the lens 20 viewed from the image pickup plane side. A hatched area represents the antireflection film 40 evaporated onto the lens 20. An area 21b1 is an area in the connecting part 21 in which the antireflection film 40 is evaporated. An area 21b2 is an area in the connecting part 21 in which the antireflection film 40 is not evaporated. In this embodiment, the area 21b2 is utilized for a part for holding the lens 20 when the lens 20 is set to the evaporation coater. Therefore, the antireflection film 40 is not evaporated onto the area 21b2.

Figure 5:
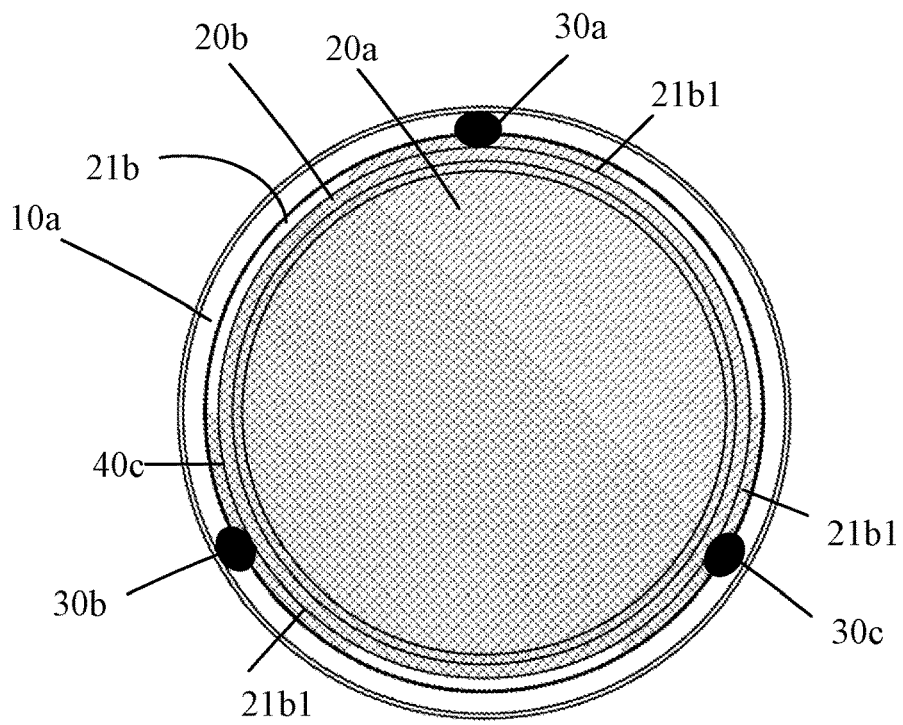
FIG. 5 illustrates the adhered lens viewed from the image pickup plane side according to the first embodiment.

FIG. 5 illustrates the lens 20 adhered to the lens 10 viewed from the image pickup plane side. The hatched area represents the antireflection film 40 evaporated onto the lens 20. The lens 20 is adhered to the lens 10 by adhesives 30a, 30b, and 30c applied to three spots by a constant quantity ejector. The adhesives 30a, 30b, and 30c are applied to the areas 21b1 evaporated with the antireflection film 40 in the connecting part 21b. This embodiment provides three adhesion spots, but the number of adhesion spots is not limited as long as the adhesive 30 is applied to the area on which the antireflection film 40 is formed. The applied range of the adhesive 30 per one spot may be extended to the circumferential direction. In this embodiment, the lens 20 is the resin lens and thus the gate trace of the gate in the injection molding may partially overlap the connecting part 21b. In that case, the adhesive 30 may be applied to a position outside the gate trace of the connecting part 21b.

In this embodiment, the lens 20 has an extremely hard-to-wet or hydrophobic nature since it is made of a hard-to-bond material. In other words, the lens 20 has an adhesive-repellent property. However, it is known that the nature of the surface turns from the hydrophobicity to the hydrophilicity when the antireflection film is formed on the surface made of the optical resin material that exhibits the hydrophobicity. Hence, the nature of the part in which the antireflection film 40 is formed can be turned into a good adhesive property by forming the antireflection film 40 on the surface of the lens 20. This embodiment uses the antireflection film as a coating layer, but may use another film if the other film can be used for the optical function surface and improve the hydrophilicity of the lens 20.

The adhesive power between the lens 20 and the adhesive 30 can be improved in the adhesion area by applying the adhesive 30 to the area in which the antireflection film 40 is formed on the surface on the lens 20. Since the antireflection film 40 is not formed or the antireflection film 40d is formed with an extremely thin thickness on the surface of the outer periphery part 21a contained in the adhesion area, the outer periphery part 21a is maintained hydrophobic. Since the adhesion property improves among the adhesive and the outer periphery surface 20b and the area 21b1 in which the antireflection film 40 is formed, the lens 20 is firmly fixed onto the lens 10.

As described above, the optical apparatus according to this embodiment has a simple configuration without adding new components, can reduce the distortion of the optical function surfaces of the lenses 10 and 20, and fix the lens 20 onto the lens 10. That the lens 20 can be fixed means that the lens 20 can be fixed onto the lens 10 firmly enough to use the optical apparatus.

According to this embodiment, the optical function surface of the lens 10 has a concave surface on the image pickup plane side but may have a convex surface on that side. In that case, the lens 20 may be adhered to the lens 10 while the contact part 20c contacts the same surface as the optical function surface outside the optical effective diameter.

While this embodiment uses the contact surface 10a for the contact surface with the contact part 20c and the adhesive surface with and the adhesive 30, the contact surface may not be the same surface as the adhesive surface for the side of the lens 10 and may be a different surface.

While this embodiment adheres the lens 20 to the lens 10, it is not always necessary to adhere the lens 20 to an optical element, such as a lens, and the lens 20 may be adhered to a resin or metal member or another member.

While this embodiment disposes the lens 20 on the image pickup plane side of the lens 10 but the lens 20 may be disposed on the object side of the lens 10.

Second Embodiment

Figures 6A, 6B:
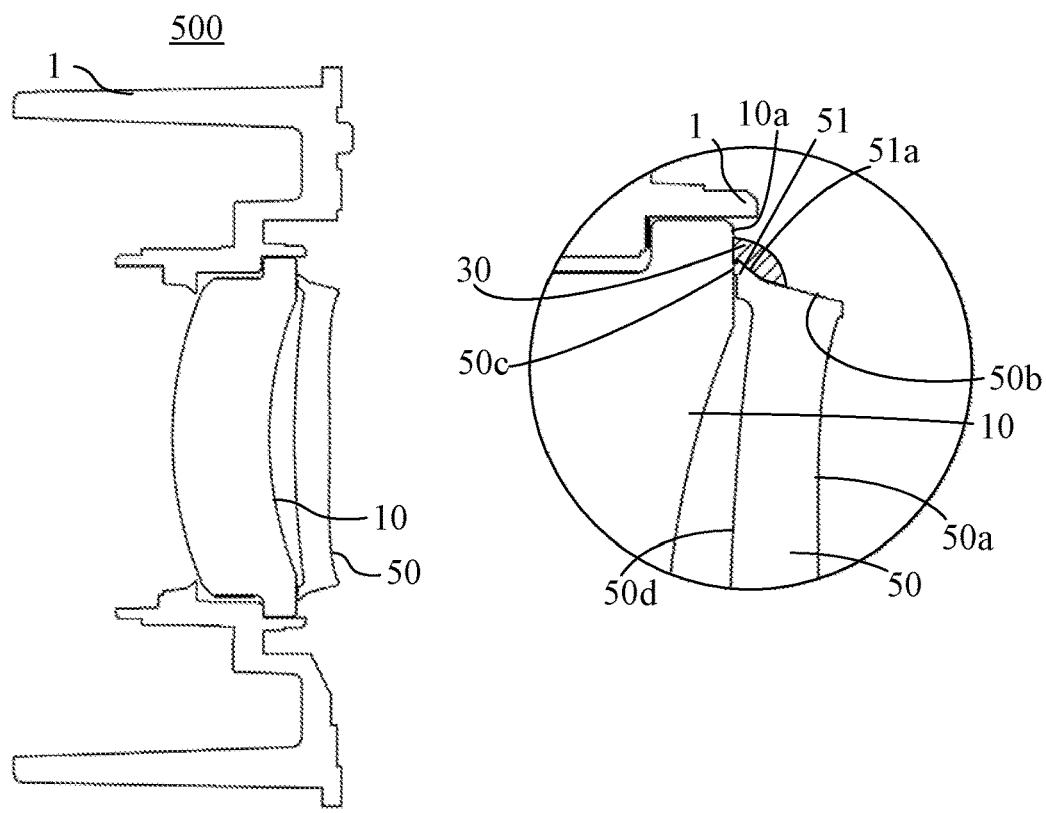
FIGS. 6A and 6B are explanatory views of a lens unit according to a second embodiment.

This embodiment describes a lens unit 500 having a lens 50 with a shape different from that of the lens 20 described in the first embodiment. FIGS. 6A and 6B are explanatory views of the lens unit 500 according to this embodiment. FIG. 6A is a sectional view of the lens unit 500, and FIG. 6B is a partially enlarged view of FIG. 6A. In the following description, a direction in which the optical axis in the image pickup optical system extends is set to an optical axis direction, the right side in FIGS. 6A and 6B is an image pickup plane side, and the left side in FIGS. 6A and 6B is an object side. Those elements in this embodiment, which are corresponding elements in the first embodiment, will be designated by the same reference numerals and a description thereof will be omitted.

The lens 50 is located on the image pickup plane side of the lens 10 and adhered to the lens 10 while the lens 10 and the lens 50 have a common optical axis (or the optical axis of the lens 10 is aligned with that of the lens 50). The position of the lens 50 is adjustable so that the optical axis of the lens 50 shifts from that of the lens 10 so as to optimize the optical image formed by the lens unit 500 or the image pickup optical system that contains the lens unit 500. In this case, the lens 50 is adhered to the lens 10 while the optical axis of the lens 10 shifts from that of the lens 50.

The lens 50 is a resin lens made of an optical resin material, such as cycloolefin polymer. Cycloolefin polymer is a hard-to-bond material having an extremely low adhesive property. The lens 50 may be a lens made of a glass material representing a hard-to-bond property. The lens 50 has an optical function surface 50a on the image pickup plane side and an optical function surface 50d on the object side, as illustrated in FIG. 6B. The image pickup light emitted from the lens 10 passes the optical function surfaces 50d and 50a and then is guided to the image pickup element 200. An outer peripheral surface 50b of the lens 50 is formed so that its diameter reduces in a direction separating from the lens 10 (towards the image pickup plane). The lens 50 includes a flange part 51 that projects from the outer periphery part 50b to the outer periphery direction. The flange part 51 includes a conical outer periphery part 51a around the optical axis as a center. The outer periphery part 51a is formed so that the diameter reduces in a direction separating from the lens 10 (towards the image pickup plane). The angle between the outer peripheral surface 51a and the optical axis is larger than the angle between the outer peripheral surface 50b and the optical axis. The lens 50 has a contact part 50c that contacts the contact surface 10a of the lens 10.

The lenses 10 and 50 are adhered to each other by the adhesive 30 while the contact surface 10a contacts the contact part 50c. For example, an ultraviolet curable adhesive that is curable by the ultraviolet light is used for the adhesive 30. The adhesive 30 adheres at least part of the contact surface 10a and at least part of the flange part 51 and the outer peripheral surface 50b. An area in which the lenses 10 and 50 are adhered to and fixed onto each other by the adhesive 30 will be referred to as an adhesion area in this embodiment. In other words, the adhesive 30 is applied to the adhesion area such that the flange part 51 is held between the adhesive 30 and the contact surface 10a (so as to cover the flange part 51). Hence, the adhering state between the contact surface 10a and the contact part 50c can be maintained. The rigidity of the adhesive 30 prevents the contact surface 10a from separating or shifting from the contact surface 50c even when an impact is applied to the lens unit 500 from the outside. Therefore, the configuration of this embodiment can strongly fix the lens 50 onto the lens 10.

Similar to the first embodiment, this embodiment separates the optical function surface from the adhesion area and makes the rigidity near the adhesion area much lower than that of part that forms the optical function surface. This configuration can reduce the influence that causes the deterioration of the optical performance.

It is unnecessary to form the flange part 51 over the overall outer periphery of the lens 50, and the flange part 51 may be formed only at least on the adhesive portion.

Figure 7:
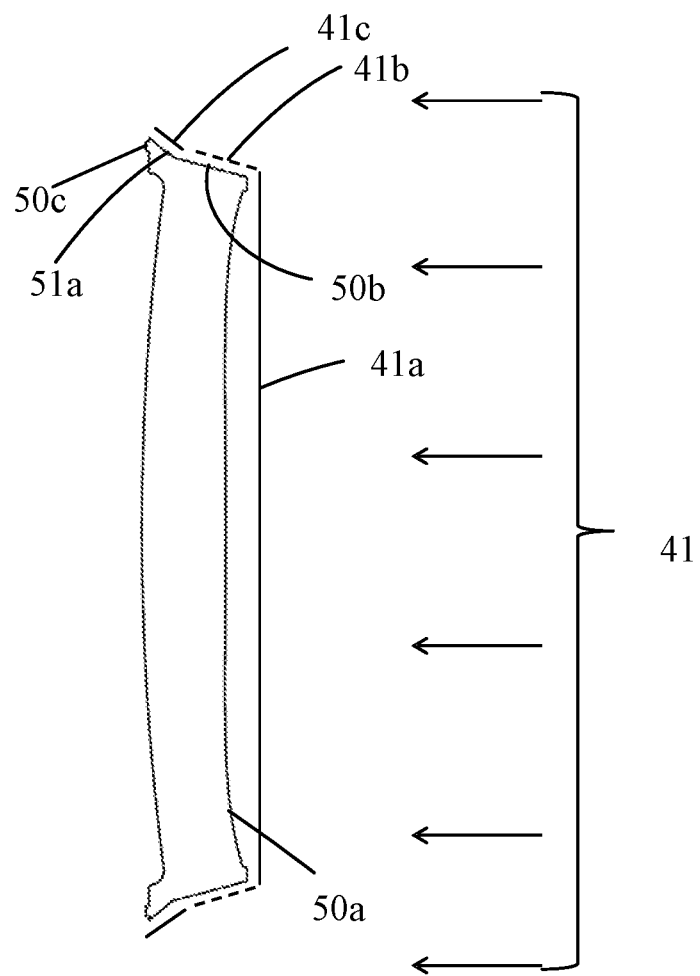
FIG. 7 is a schematic diagram when an antireflection film is evaporated onto a lens according to the second embodiment.

This embodiment forms the antireflection film (coating layer) that contains a material, such as $SiO_2$, on the surfaces of the optical function surfaces 50a and 50d of the lens 50. FIG. 7 is a schematic view when an antireflection film 41 is evaporated on the lens 50 from the image pickup plane side. The lens 50 may be set to an evaporation coater so that the evaporation coater can release a film material to the lens 50 along the optical axis of the lens 50. This setting can make approximately uniform the film thickness of the antireflection film 41a evaporated onto the optical function surface 50a. Since the outer peripheral surface 51b is a bevel surface that has a slope relative to the optical axis, an antireflection film 41b thinner than the antireflection film 41a is evaporated onto the outer peripheral surface 51b. Since the angle between the outer peripheral surface 51a and the optical axis is larger than the angle between the outer peripheral surface 50b and the optical axis, an antireflection film 41c is evaporated on the outer periphery part 51a with a thickness larger than the thickness of the antireflection film 41b. The antireflection films 41a, 41b, and 41c have different film thicknesses, but each of them serves as the antireflection film 41.

In this embodiment, due to the specification of the evaporation coater of the antireflection film 41, part of the outer periphery part 51a is used for the holding part of the lens 50 in the evaporation. In that case, the outer periphery part 51a has an area in which the antireflection film 41 is evaporated, and an area in which the antireflection film 41c is not evaporated. This embodiment applies the adhesive 30 to the area in which the antireflection film 41c is evaporated, similar to the first embodiment.

Since this embodiment evaporates the antireflection film 41 onto the overall adhesive part between the lens 50 and the adhesive 30, the adhesive part of the lens 50 can be made hydrophilic. Hence, the adhesive power between the lens 50 and the adhesive 30 can be improved in the adhesion area, and the lens 50 can be firmly fixed onto the lens 10.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-216181, filed on Nov. 4, 2016, which is hereby incorporated by reference herein in its entirety.

What is claimed is:

1. An optical apparatus comprising:
   an attached member; and
   an optical element attached to the attached member, and including:
      an optical function surface on which a coating layer is disposed;
      an outer peripheral surface;
      a flange part that projects from the outer peripheral surface in an outer periphery direction and including:
         an outer periphery part with a diameter thereof that increases toward a side contacting the attached member;
         a plane part connected to the outer periphery part outside the outer peripheral surface;
         a contact part provided on a side of the attached member and contacting the attached member;
         a first area where the coating layer is also disposed; and
         a second area where the coating layer is not disposed, the first and second areas being arranged along a circumferential direction,
   wherein the optical element and the attached member are adhered to each other with an adhesive while the optical element and the attached member contact each other,
   wherein, along a cross section of the optical element including an optical axis thereof and the first area, a length of the contact part is shorter than the length of the plane part,
   wherein only part of the outer peripheral surface and the first area of the flange part are covered with the adhesive, in an adhesion area where the optical element and the attached member are adhered to each other by the adhesive, without the second area being covered with the adhesive.

2. The optical apparatus according to claim 1, wherein the plane part is perpendicular to the optical axis.

3. The optical apparatus according to claim 1, wherein the coating layer is an evaporation coated layer.

4. The optical apparatus according to claim 1, wherein the coating layer is an antireflection layer.

5. The optical apparatus according to claim 1, wherein:
   the attached member includes a contact surface that partially contacts the optical element and is perpendicular to the optical axis, and
   the adhesive is on at least part of the contact surface.

6. The optical apparatus according to claim 1, wherein the optical element is a resin lens.

7. The optical apparatus according to claim 1, wherein the optical element constitutes part of an image pickup optical system.

8. The optical apparatus according to claim 1, wherein the attached member is an optical element that constitutes part of an image pickup optical system.

9. The optical apparatus according to claim 1, wherein the optical apparatus is a lens barrel that includes an image pickup optical system.

10. The optical apparatus according to claim 1, wherein the optical apparatus is an image pickup apparatus that includes:
    a lens barrel that includes an image pickup optical system, and
    an image pickup element configured to receive and photoelectrically convert a light flux that has passed the lens barrel.

11. The optical apparatus according to claim 1, wherein the adhesive covers a surface of the attached member that is perpendicular to the optical axis and the first region of the flange part in the adhesive area.

12. The optical apparatus according to claim 1, wherein:
    the first area and the second area are in the outer periphery part, and
    the adhesive is disposed on the first area and the outer periphery part, in the adhesion area.

* * * * *